United States Patent
Shen et al.

(10) Patent No.: US 9,431,911 B2
(45) Date of Patent: Aug. 30, 2016

(54) SWITCHING MODE POWER SUPPLY CAPABLE OF PROVIDING A BLOCK TIME IN RESPONSE TO AN OUTPUT CURRENT

(71) Applicant: Grenergy Opto Inc., Hsin-Chu (TW)

(72) Inventors: Yi-Lun Shen, Hsin-Chu (TW); Ren-Yi Chen, Hsin-Chu (TW)

(73) Assignee: GRENERGY OPTO INC., Hsin-Chu (TW)

( * ) Notice: Subject to any disclaimer, the term of this patent is extended or adjusted under 35 U.S.C. 154(b) by 303 days.

(21) Appl. No.: 14/333,422

(22) Filed: Jul. 16, 2014

(65) Prior Publication Data

US 2016/0020699 A1    Jan. 21, 2016

(51) Int. Cl.
*H02M 3/335*    (2006.01)
*H02M 1/44*    (2007.01)
*H02M 7/537*    (2006.01)

(52) U.S. Cl.
CPC ........... *H02M 3/33507* (2013.01); *H02M 1/44* (2013.01)

(58) Field of Classification Search
CPC ........... H02M 3/335; H02M 3/33507; H02M 3/33515; H02M 3/33523; H02M 7/537
See application file for complete search history.

(56) References Cited

U.S. PATENT DOCUMENTS 8,054,656 B2 * 11/2011 Su ..................... H02M 3/33523
363/21.15
2011/0305053 A1 * 12/2011 Lin ......................... H02M 1/44
363/95

* cited by examiner

*Primary Examiner* — Gary L Laxton
(74) *Attorney, Agent, or Firm* — McClure, Qualey & Rodack, LLP

(57) ABSTRACT

A power controller provides a block time in response to an output current to an output load, and the block time determines a maximum switching frequency of a switching mode power supply. An exemplifying power controller has an output current estimator, a block time generator, and a pulse width modulator. The output current estimator provides a load representative signal in response to a discharge time of the inductive device and a current sense signal, wherein the current sense signal represents a current through an inductive device. The block time generator provides a block time based on the load representative signal. The pulse width modulator generates a pulse-width-modulation signal to control a power switch in response to a compensation signal, which is in response to the output voltage to the output load. The cycle time of the pulse-width-modulation signal is limited to be not less than the block time.

13 Claims, 11 Drawing Sheets

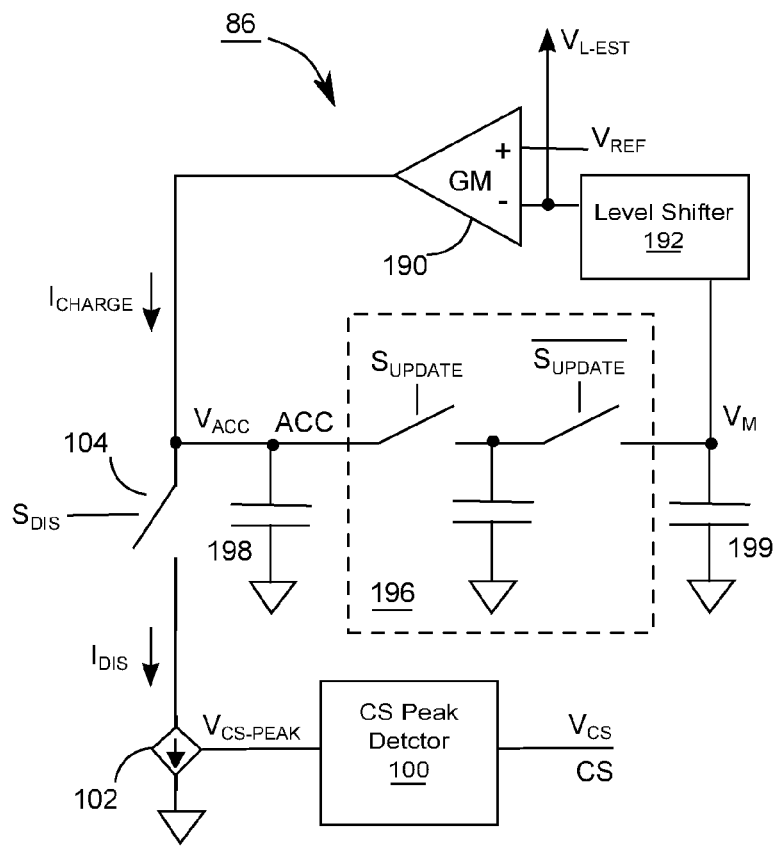
FIG. 5
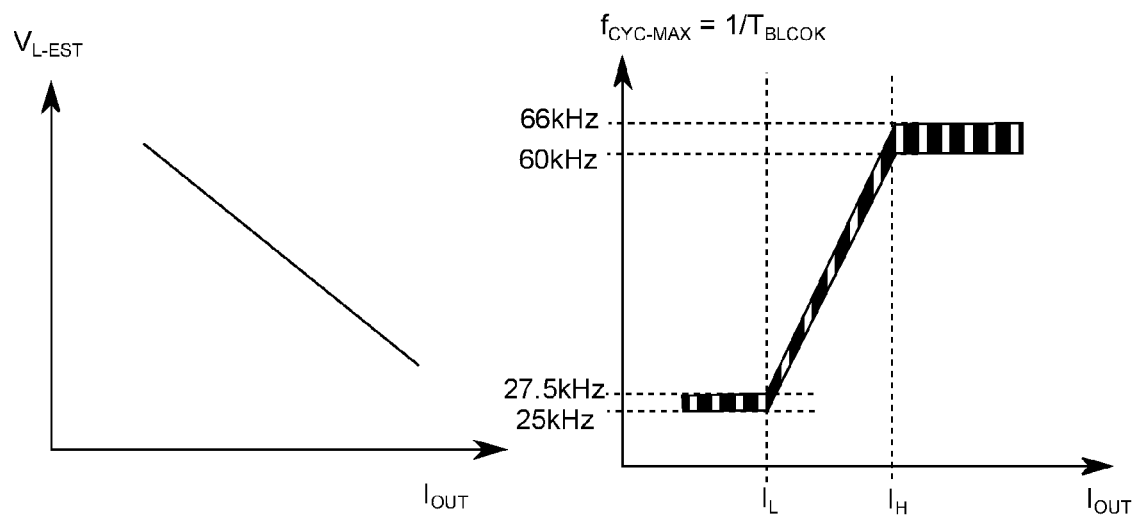
FIG. 6
FIG. 7

SWITCHING MODE POWER SUPPLY CAPABLE OF PROVIDING A BLOCK TIME IN RESPONSE TO AN OUTPUT CURRENT

BACKGROUND

The present disclosure relates generally to switching mode power supplies.

Switching mode power supplies (SMPS) typically utilize a power switch to control the current through an inductive device in order to regulate a current output or a voltage output. In comparison with other kinds of power supplies, SMPS are commonly compact and power efficient, so as being popular nowadays.

One kind of SMPS operates in quasi-resonance (QR) mode and is referred to QR converters. The power switch in a QR converter is switched from an OFF state (performing an OFF circuit) to an ON state (performing a short circuit) substantially at the moment when the voltage drop across the power switch is at a minimum, so the switching loss might be minimized, theoretically. Observation has proofed that the power conversion efficiency of a QR converter is really excellent especially when it supplies power to a heavy load.

FIG. 1 demonstrates a QR converter 10 in the art, where a transformer, an inductive device, has a primary winding PRM, a secondary winding SEC and an auxiliary winding AUX, all inductively coupled to each other. The QR converter 10 is powered by input voltage $V_{IN}$, to supply power, in the form of output voltage $V_{OUT}$ and output current $I_{OUT}$, to an output load 24. QR converter 10 provides pulse-width-modulation (PWM) signal $V_{GATE}$ at driving node GATE to periodically turn ON and OFF a power switch 34. Via the voltage division provided from resistors 28 and 30, QR converter 10 further monitors voltage drop VAUX across the auxiliary winding AUX. FIG. 2 illustrates the waveforms of PWM signal $V_{GATE}$ and voltage drop $V_{AUX}$. Shown in FIG. 2, two consecutive rising edges of PWM signal $V_{GATE}$ define one switching cycle, whose duration is referred to as a cycle time $T_{CYC}$ consisting of an ON time $T_{ON}$ and an OFF time $T_{OFF}$, where the ON time $T_{ON}$ and the OFF time $T_{OFF}$ are the durations when the power switch 34 is kept as being ON and OFF, respectively. FIG. 2 also demonstrates that the ON time $T_{ON}$ is also the pulse width of the PWM signal $V_{GATE}$. Demonstrated in FIG. 2, about the middle of the OFF time $T_{OFF}$, the voltage drop $V_{AUX}$ starts oscillating because of the power depletion of the transformer, and signal valleys $VL_1$ and $VL_2$ are therefore generated. QR controller 26 ends a cycle time $T_{CYC}$ or an OFF time $T_{OFF}$ at the moment when signal valley $VL_2$ substantially occurs as demonstrated in FIG. 2. This kind of method to end a cycle time $T_{CYC}$ in a signal valley is known and referred to as valley switching.

QR converter 10 has, at a compensation node COMP, a compensation signal $V_{COMP}$, controlled by operational amplifier (OP) 20, in response to the difference between the output voltage $V_{OUT}$ and a target voltage $V_{TAR}$. The compensation signal $V_{COMP}$ in the QR converter 10 controls both the ON time $T_{ON}$ and a block time $T_{BLOCK}$, where the next switching cycle is not allowed to start until the block time $T_{BLOCK}$ ends. The block time $T_{BLOCK}$ prevents a switching frequency $f_{CYC}$, the reciprocal of a cycle time $T_{CYC}$, from being over high. An over-high switching frequency $f_{CYC}$ probably lowers the power conversion due to the more power loss in charging and discharging the driving node GATE. The block time $T_{BLOCK}$ equivalently defines a maximum switching frequency $f_{CYC\text{-}MAX}$, which is the reciprocal of the block time $T_{BLOCK}$.

QR converter 10 usually encounters two issues.

The first issue is the hardship to solve electromagnetic interference (EMI). For a constant output load 24, the compensation signal $V_{COMP}$ could be a constant, and the power switch 34 is turned on in a certain signal valley to conclude a cycle time $T_{CYC}$, implying a constant switching frequency $f_{CYC}$ and intensive EMI, normally unacceptable in the art. A known solution for this EMI issue is to intentionally disturb the compensation signal $V_{COMP}$. The feedback loop provided by the operational amplifier 20 in FIG. 1, however, tends to cancel any disturbance introduced to the compensation signal $V_{COMP}$. Therefore, this solution hardly helps the EMI issue.

Another issue is the occurrence of intolerable audible noise. In some conditions with a certain output load 24, the compensation signal $V_{COMP}$ spontaneously vibrates, and QR controller 26 performs valley switching not constantly in a certain signal valley, but alternatively in two adjacent signal valleys. In other words, due to the vibration of the compensation signal $V_{COMP}$, valley switching might be first in a certain signal valley for several switching cycles, then followed by shifting to be in an adjacent signal valley for a while, and then further followed by shifting back to be in the certain signal valley for a while, and so forth. This instability in valley switching could result in audible noise, which is normally intolerable in the market, especially for the applications targeting to a quiet environment.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein:

FIG. 5 exemplifies a current estimator;

FIG. 6 demonstrates a one-to-one relationship between the load representative signal $V_{L\text{-}EST}$ and the output current $I_{OUT}$;

FIG. 7 demonstrates a possible relationship between the maximum switching frequency $f_{CYC\text{-}MAX}$ and the output current $I_{OUT}$;

DETAILED DESCRIPTION

In one embodiment of the invention, a compensation signal $V_{COMP}$ of a power controller controls the ON time $T_{ON}$, but not the block time $T_{BLOCK}$, which instead is in response to a load representative signal $V_{L-EST}$ that is capable of representing a present output current $I_{OUT}$ to an output load. The power controller detects an auxiliary winding AUX to determine a discharge time $T_{DIS}$ of the transformer. The load representative signal $V_{L-EST}$ could be derived by the discharge time $T_{DIS}$ and a current sense signal $V_{CS}$, which indicates the current passing through the primary winding PRM of the transformer. The block time $T_{BLOCK}$ is in response to the load representative signal $V_{L-EST}$. The power controller is not allowed ending a cycle time $T_{CYC}$ until the block time $T_{BLOCK}$ elapses.

Simply speaking, in one embodiment of the invention, the ON time $T_{ON}$ and the block time $T_{BLOCK}$ are in response to the compensation signal $V_{COMP}$ and the load representative signal $V_{L-EST}$, respectively.

Based on this design concept, if the output current $I_{OUT}$ to an output load is a constant, the block time $T_{BLOCK}$ will be about a corresponding constant accordingly. Meanwhile, the feedback loop provided by the operational amplifier 20 automatically adjusts the compensation signal $V_{COMP}$ to provide an appropriate ON time $T_{ON}$, for sustaining the output current $I_{OUT}$. It can be concluded that valley switching could be performed at a certain signal valley for a constant output load and that the instability of valley switching in the prior art could be eliminated.

One embodiment of the invention jitters the block time $T_{BLOCK}$, in order to solve the possible EMI issue due to the valley switching in a certain signal valley for a constant output load. Jittering to the block time $T_{BLOCK}$ certainly influences the compensation signal $V_{COMP}$, which in one embodiment of this invention has no impact to the block time $T_{BLOCK}$, because the block time $T_{BLOCK}$ is substantially in response only to the jittering and the output current $I_{OUT}$ while the output current $I_{OUT}$ is a constant during the measurement of EMI. Unlike what happens in the prior art, the jittering to the block time $T_{BLOCK}$ will not be tapered by the feedback loop in the power converter. Therefore, jittering to the block time $T_{BLOCK}$ could vary the block time $T_{BLOCK}$ to a predetermined extent, so as to effectively jitter the switching frequency $f_{CYC}$ and solve the EMI issue.

Figure 1:
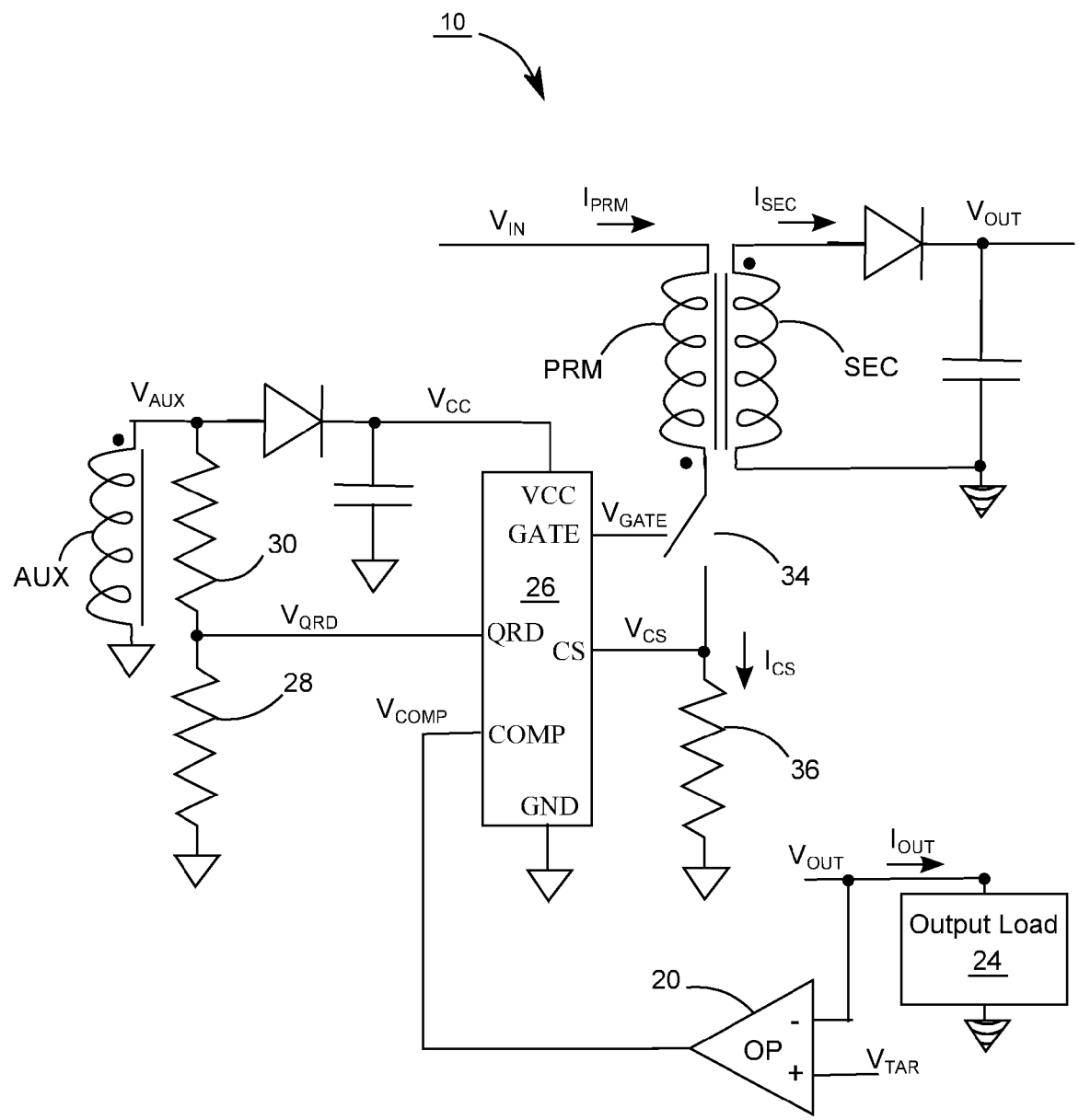
FIG. 1 demonstrates a QR converter in the art.
Figure 2:
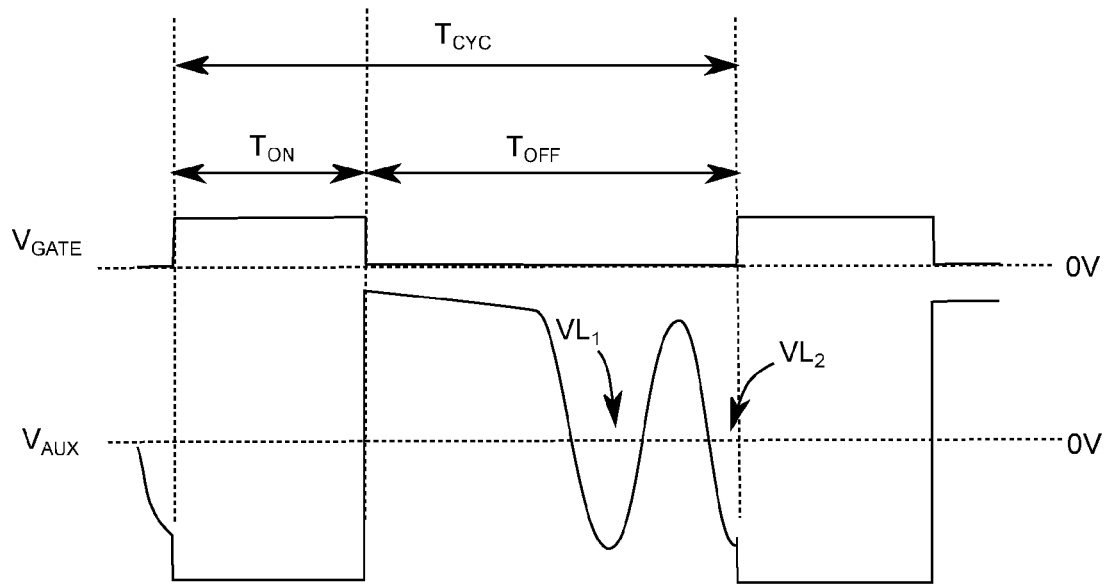
FIG. 2 illustrates the waveforms of PWM signal $V_{GATE}$ and voltage drop $V_{AUX}$.
Figure 3:
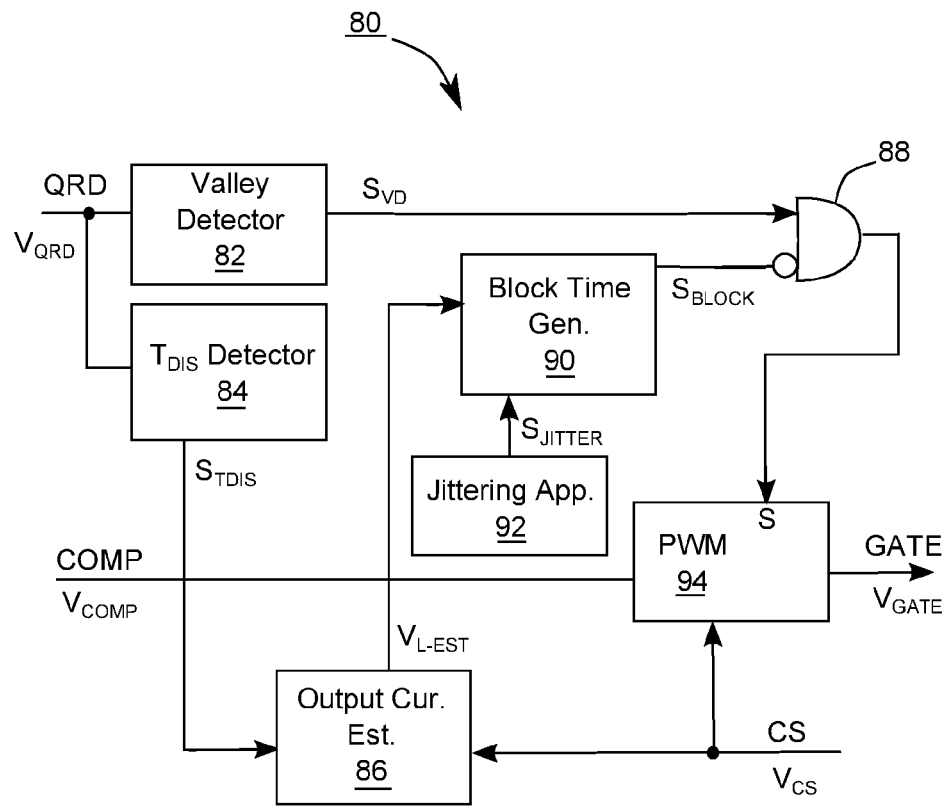
FIG. 3 shows a QR controller, which in some embodiments of the invention replaces the QR controller in FIG. 1.
Figure 4:
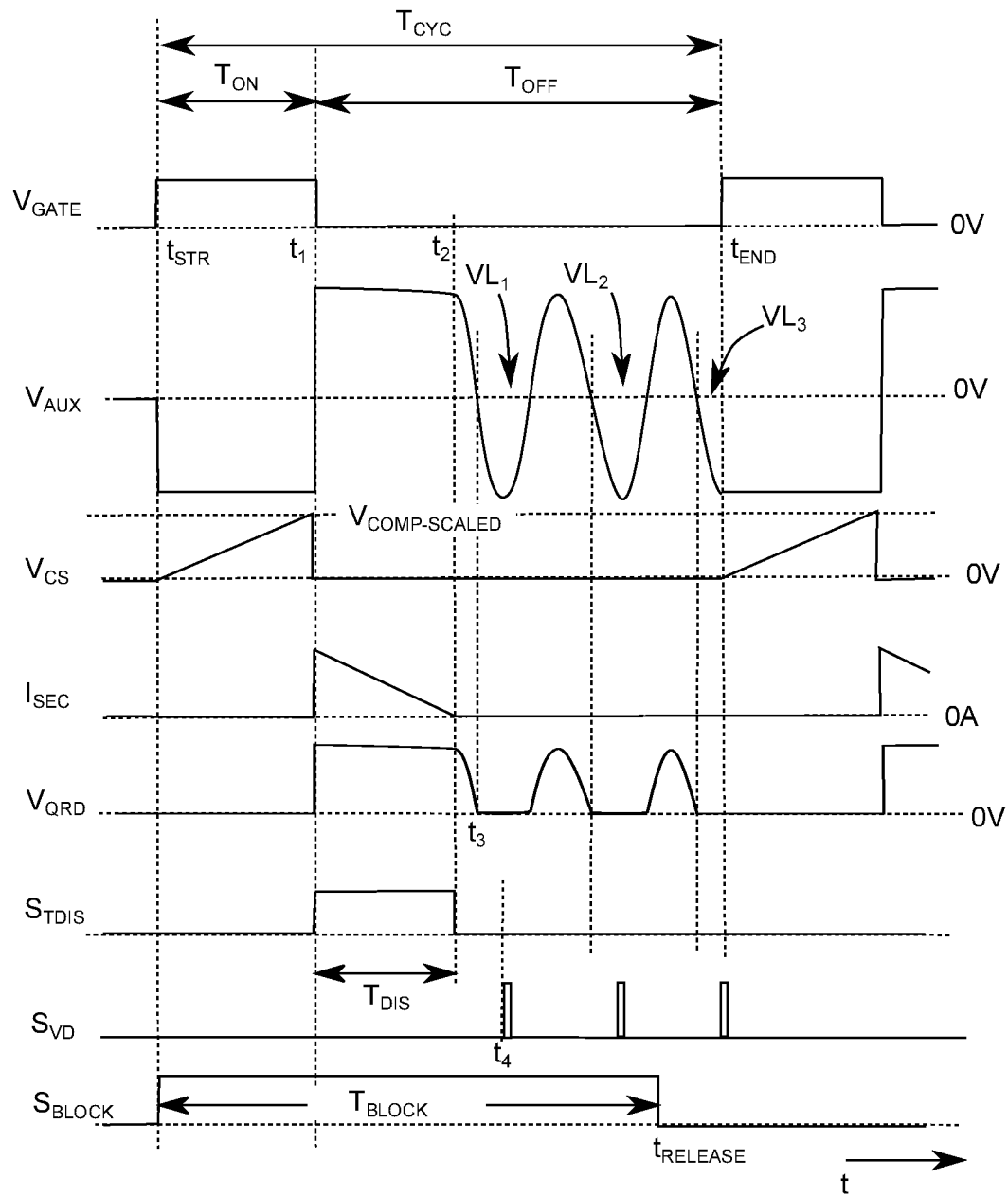
FIG. 4 demonstrates some signals in FIG. 1 when the QR controller 26 is replaced by the QR controller of FIG. 3.

FIG. 3 shows a QR controller 80, which in some embodiments of the invention replaces the QR controller 26 in FIG. 1. Exemplified in FIG. 3, the QR controller 80 includes a valley detector 82, a discharge time detector 84, output current estimator 86, an And gate 88, a block time generator 90, a jittering apparatus 92, and a pulse width modulator (PWM) 94. FIG. 4 demonstrates some signals in FIG. 1 when the QR controller 26 is replaced by the QR controller 80 of FIG. 3. Please refer to FIGS. 1, 3, and 4 for the following description.

Via the detection node QRD and the voltage divider consisting of resistors 30 and 28, the discharge time detector 84 is coupled to the auxiliary winding AUX to generate a discharge time signal $S_{TDIS}$ based on the voltage drop $V_{AUX}$ across the auxiliary winding AUX. The discharge time signal $S_{TDIS}$ is capable of indicating the duration of a discharge time $T_{DIS}$ when the transformer continues de-energizing. For example, the waveform of the discharge time signal $S_{STIS}$ in FIG. 4 illustrates that a discharge time $T_{DIS}$ starts at time point $t_1$ when the first rising edge of the voltage drop $V_{AUX}$ happens in a switching cycle, and ends at time point $t_2$ when a following falling edge of the voltage drop $V_{AUX}$ occurs.

The valley detector 82 also detects, via the detection node QRD, the voltage drop $V_{AUX}$ to find signal valleys. The moment of generating a pulse to the valley indication signal $S_{VD}$ virtually indicates the occurrence of a corresponding signal valley of the voltage drop $V_{AUX}$. A common method employed in the valley detector 82 is to provide a pulse to the valley indication signal $S_{VD}$ a predetermined delay time later once the voltage drop $V_{AUX}$ drops across 0V. As demonstrated by the waveforms of the voltage drop $V_{AUX}$ and the valley indication signal $S_{VD}$ in FIG. 4, during an OFF time $T_{OFF}$, the voltage drop $V_{AUX}$ drops across 0V the first time at time point $t_3$, implying the beginning of the signal valley $VL_1$, then after a certain delay time at time point $t_4$ the valley indication signal $S_{VD}$ has a pulse. Similarly, a certain delay time after the beginning of the signal valley $VL_2$, the valley indication signal $S_{VD}$ has another pulse.

Demonstrated in FIG. 3, the output current estimator 86 receives the current sense signal $V_{CS}$ and the discharge time signal $S_{TDIS}$, and accordingly provides a load representative signal $V_{L-EST}$. The current sense signal $V_{CS}$ is at a current detection node CS and represents the current $I_{CS}$ following through the resistor 36, which also represents the current $I_{PRM}$ flowing through the primary winding PRM. The load representative signal $V_{L-EST}$ could represent the output current $I_{OUT}$ to the output load 24, even though it is just an estimative result based on the current sense signal $V_{CS}$ and the discharge time signal $S_{TDIS}$. The operation and theory used in the output current estimator 86 will be detailed later.

The block time generator 90 provides a block signal $S_{BLOCK}$ to indicate a block time $T_{BLOCK}$, in response to the load representative signal $V_{L-EST}$. For example, the block time $T_{BLOCK}$ is in positive correlation with the load representative signal $V_{L-EST}$, or the larger load representative signal $V_{L-EST}$ the larger block time $T_{BLOCK}$. As shown by the waveform of the block signal $S_{BLOCK}$ in FIG. 4, the cycle time $T_{CYC}$ and the block time $T_{BLOCK}$ substantially start at the same time (at time point $t_{STR}$), and the block time $T_{BLOCK}$ concludes at time point $t_{RELEASE}$. Hereinafter, the occurrence of the time point $t_{RELEASE}$ means the conclusion of the block time $T_{BLOCK}$.

The jittering apparatus 92 in FIG. 3, connected to the block time generator 90, provides a control signal $S_{JITTER}$ to slightly and slowly alter the block time $T_{BLOCK}$. For example, in a stable condition when the output load 24 is a constant, the control signal $S_{JITTER}$ is a periodic signal with a jittering frequency of 400 Hz, and makes the block time $T_{BLOCK}$ change in a range from 1/(27.5 kHz) to 1/(25 kHz), such that the switching frequency $f_{CYC}$ could vary in a frequency range from 25 kHz to 27.5 kHz. Preferably, the jittering frequency of the control signal $S_{JITTER}$, which is 400 Hz for example, is much smaller than the switching frequency $f_{CYC}$ of the power converter, which is about tens of kilohertz in practice.

The And gate 88 has two inputs respectively coupled to the block time generator 90 and the valley detector 82, for transmitting the pulse in the valley indication signal $S_{VD}$ to set the PWM 94 only after the block time $T_{BLOCK}$ ends. Shown by the waveforms of the valley indication signal $S_{VD}$ and the block signal $S_{BLOCK}$ in FIG. 4, at the time point $t_{END}$ after the block time $T_{BLOCK}$ ends, a pulse is provided to the valley indication signal $S_{VD}$, and this pulse passes through the And gate 8 8 to set the PWM 94, making the PWM signal $V_{GATE}$ "1" in logic and concluding both the OFF time $T_{OFF}$ and the cycle time $T_{CYC}$. The And gate 88 ends a cycle time $T_{CYC}$ substantially at the moment ($t_{END}$) when the first signal valley, which is the signal valley $VL_3$ in FIG. 4, occurs after the end of the block time $T_{BLOCK}$. The time point $t_{END}$ in one switching cycle is equivalent to the time point $t_{STR}$ in the next switching cycle.

As demonstrated in FIG. 4, when the PWM signal $V_{GATE}$ is set to be "1" in logic, the power switch 34 is turned on, and both the cycle time $T_{CYC}$ and the ON time $T_{ON}$ begin. The PWM 94 determines the duration of the ON time $T_{ON}$ in response to the current sense signal $V_{CS}$ and the compensation signal $V_{COMP}$. For example, there in FIG. 4 is another compensation signal $V_{COMP-SCALED}$, which is a scaled version of the compensation signal $V_{COMP}$. Once the current sense signal $V_{CS}$ exceeds the compensation signal $V_{COMP-SCALED}$, the PWM signal $V_{GATE}$ is reset to be "0" in logic, such that the ON time $T_{ON}$ ends and the OFF time $T_{OFF}$ begins.

FIG. 5 exemplifies the current estimator 86, which has a transconductor 190, a level shifter 192, an update circuit 196, an accumulative capacitor 198, a switch 104, a voltage-controlled current source 102, and a CS peak voltage detector 100.

The CS peak voltage detector 100 generates a signal $V_{CS-PEAK}$ representing a peak of the current sense signal $V_{CS}$. One example of the CS peak voltage detector 100 could be found in FIG. 10 of US patent application publication US20100321956, which is incorporated by reference in its entirety. Some embodiments of the invention might use the average current detector in FIG. 17 or 18 of US20100321956 to replace the CS peak voltage detector 100. The voltage-controlled current source 102 receives and converts the signal $V_{CS-PEAK}$ into a discharge current $I_{DIS}$, which drains from node ACC when the discharge time signal $S_{TDIS}$ is "1" in logic. In other words, the total time that the discharge current $I_{DIS}$ drains from the node ACC is about the discharge time $T_{DIS}$. Some other embodiments could omit the switch 104 in FIG. 5, but use the discharge time signal $S_{TDIS}$ to enable or disable the voltage-controlled current source 102 instead. The voltage $V_M$ on the capacitor 199 is level shifted to be the load representative signal $V_{L-EST}$, which is compared with a predetermined reference voltage $V_{REF}$ by transconductor 190. Based on the comparison result, the transconductor 190 outputs a charge current $I_{CHARGE}$ to constantly charge the node ACC. The update circuit 196, capable of being triggered by signal $S_{UPDATE}$, samples the voltage $V_{ACC}$ at the node ACC to update the voltage $V_M$. In one embodiment, the voltage $V_M$ is updated once every switching cycle. For example, the signal $S_{UPDATE}$ is equivalent to the PWM signal $V_{GATE}$ in light of their logic values, implying the voltage $V_M$ is updated every time when the OFF time just begins. Some embodiments might update voltage $V_M$ once every several switching cycles, nevertheless. The voltage $V_M$ is held as a constant, until it is updated to become another constant. As derivable from the teaching in this specification, the charge current $I_{CHARGE}$ is a constant as long as the voltage $V_M$ is kept as unchanged.

In one cycle time $T_{CYC}$, the accumulative capacitor 198 accumulates the difference between an integral of the charge current $I_{CHARGE}$ over a cycle time $T_{CYC}$ and another integral of the discharge current $I_{DIS}$ over the discharge time $T_{DIS}$.

Similar to the analysis disclosed in US20100321956, if the voltage $V_{ACC}$ at the moment when it is currently being sampled is the same as the voltage $V_{ACC}$ at the moment when it was sampled last time, the charge current $I_{CHARGE}$ is substantially in proportion to the output current $I_{OUT}$ to the output load 24. In other words, the charge current $I_{CHARGE}$ could represent the output current $I_{OUT}$ if the sampled result of the voltage $V_{ACC}$ has no influence to the voltage $V_M$. The update circuit 196, the level shifter 192a and the transconductor 190 together as a whole form a loop with a negative loop gain, to stabilize the voltage $V_{ACC}$ at the moment when being sampled. For example, if the present charge current $I_{CHARGE}$ is, to some extent, larger than a corresponding value representing the output current $I_{OUT}$, the voltage $V_{ACC}$ will become larger at the moment when sampled the next time, enlarging voltage $V_M$ and decreasing the charge current $I_{CHARGE}$, such that the charge current $I_{CHARGE}$ approaches the corresponding value, and vice versa. With a proper negative loop gain, the voltage $V_M$ can steadily approach to a constant over time, resulting in the charge current $I_{CHARGE}$ in proportion to the output current $I_{OUT}$. When the charge current $I_{CHARGE}$ is in proportion to the output current $I_{OUT}$, the integral of the charge current $I_{CHARGE}$ over a cycle time $T_{CYC}$ is equal to the integral of the discharge current $I_{DIS}$ over the discharge time $T_{DIS}$.

FIG. 6 demonstrates a one-to-one relationship between the load representative signal $V_{L-EST}$ and the output current $I_{OUT}$. Accordingly, the load representative signal $V_{L-EST}$ could represent the output current $I_{OUT}$.

The load representative signal $V_{L-EST}$ substantially determines a block time $T_{BLOCK}$, such that the output current $I_{OUT}$ substantially determines the block time $T_{BLOCK}$ and the maximum switching frequency $f_{CYC-MAX}$ (=$1/T_{BLOCK}$) as well. FIG. 7 demonstrates a possible relationship between the maximum switching frequency $f_{CYC-MAX}$ and the output current $I_{OUT}$. When the output current $I_{OUT}$ exceeds a predetermined current $I_H$, the output load 24 deems heavy and the maximum switching frequency $f_{CYC-MAX}$ slowly varies within the range from 60 kHz to 66 kHz, with the jittering frequency of the control signal $S_{JITTER}$. When the output current $I_{OUT}$ is less than a predetermined current IL, the output load 24 deems light and the maximum switching frequency $f_{CYC-MAX}$ slowly varies within the range from 25 kHz to 27.5 kHz, with the jittering frequency of the control signal $S_{JITTER}$.

Shown in FIGS. 3 and 4, the ON time $T_{ON}$ is in response to the compensation signal $V_{COMP}$, and the block time $T_{BLOCK}$ in response to the load representative signal $V_{L-EST}$.

As aforementioned, under a steady state when the output load 24 is a constant to make the output current $I_{OUT}$ constant, the block time $T_{BLOCK}$ could be constant, independent to any variation to the compensation signal $V_{COMP}$. It implies that the power switch 34 could be turned on in a fix signal valley, avoiding the instability of valley switching and the possible audible noise possibly occurring in the prior art.

Furthermore, as demonstrated in FIGS. 3 and 7, the block time $T_{BLOCK}$ is determined only by the output current $I_{OUT}$ and the control signal $S_{JITTER}$. It is well known that EMI measurement takes place only when the output current $I_{OUT}$ is constant. Therefore, in some embodiments of the invention, during EMI measurement, the control signal $S_{JITTER}$ could faithfully and slightly alter the block time $T_{BLOCK}$, so as to jitter the switching frequency $f_{CYC}$ and solve possible EMI issues.

Figure 8:
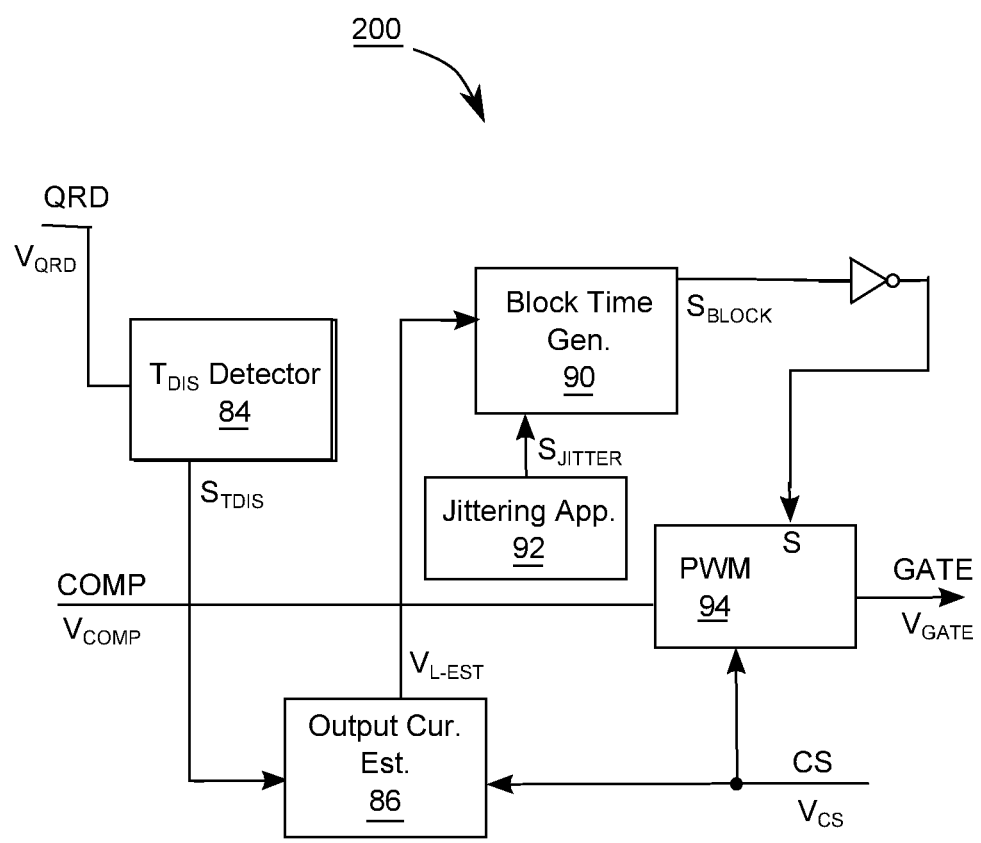
FIG. 8 shows a power controller, which in some embodiments of the invention replaces the QR controller 26 in FIG. 1.

The embodiments aforementioned so far are all QR converters, but the invention is not limited to, however. FIG. 8 shows a power controller 200, which in some embodiments of the invention replaces the QR controller 26 in FIG. 1 and does not operate the power switch 34 of FIG. 1 in QR mode. The power controller 200 of FIG. 8 has no valley detector 82 and the And gate 88 (of FIG. 3), and the inversion of the block signal $S_{BLOCK}$ goes directly to the set terminal of the PWM 94. At the moment when the block time $T_{BLOCK}$ ends, the PWM 94 is set, and the cycle time $T_{CYC}$ and the ON time $T_{ON}$ for the next switching cycle start. In other words, under the control of the power controller 200, the cycle time $T_{CYC}$ is about the block time $T_{BLOCK}$.

An embodiment of the invention substantially operates in QR mode, but, the transition of valley switching from one signal valley to another is not abrupt but "soft". For example, a power converter according to the invention could perform valley switching in a $3^{rd}$ signal valley continuously, meaning a power switch is turned on when the $3^{rd}$ signal valley occurs. Then, possibly due to the increment to the output load, the time point when the power switch is turned on moves step-by-step from the moment when the $3^{rd}$ signal valley occurs to the moment when the $2^{nd}$ signal valley occurs. After several consecutive switching cycles, the power switch is turned on right at the moment when the $2^{nd}$ signal valley occurs, performing valley switching in the $2^{nd}$ signal valley. This transition process is referred to as soft transition for valley switching, which introduces one or more switching cycles not performing valley switching between two switching cycles performing valley switching in different signal valleys respectively.

Figure 9:
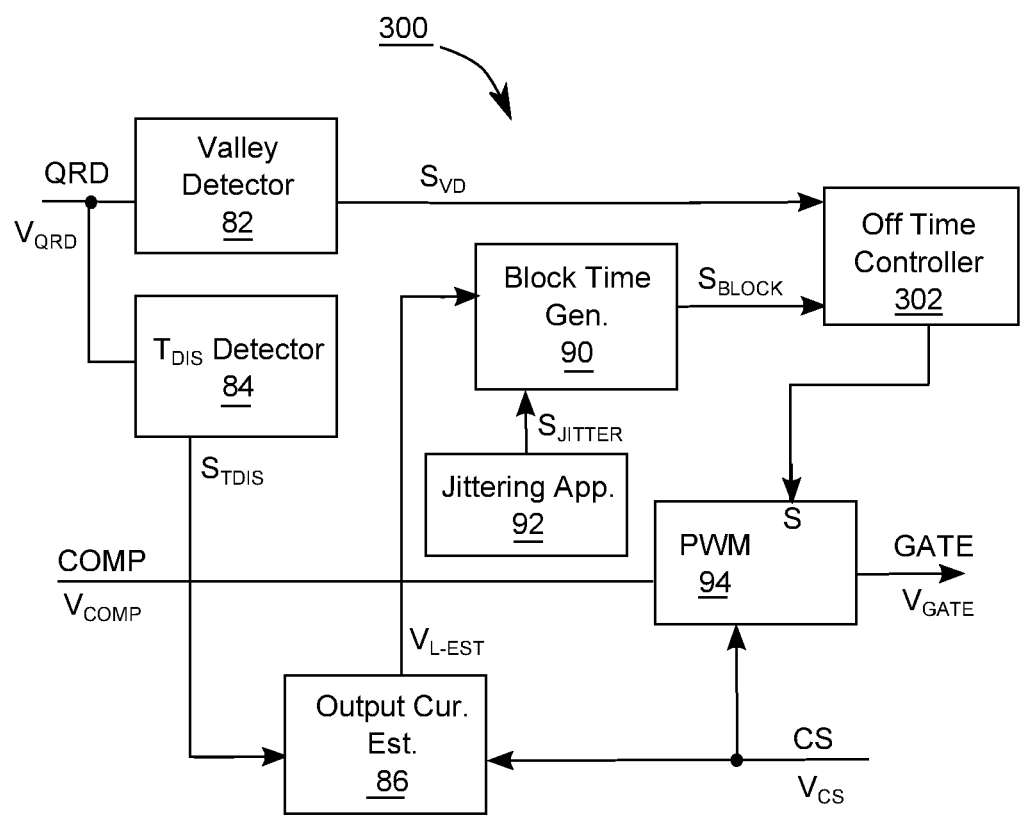
FIG. 9 shows a QR controller, which in an embodiment of the invention is a replacement for the QR controller 26 in FIG. 1.

FIG. 9 shows a QR controller 300, which in an embodiment of the invention is a replacement for the QR controller 26 in FIG. 1. FIGS. 9 and 3 have several apparatuses in common, and the similarity therebetween is comprehensible based upon the aforementioned teaching, so the similarity is not detailed due to brevity. The QR controller 300 has an OFF time controller 302 replacing the And gate 88 in the QR controller 80 (of FIG. 3). Most of time, the OFF time controller 302 performs valley switching, ending an OFF time $T_{OFF}$ when the $1^{st}$ signal valley occurs after the conclusion of the block time $T_{BLOCK}$. Nevertheless, under some circumstances, the OFF time controller 302 causes no valley switching, which will be detailed later.

Figure 10:
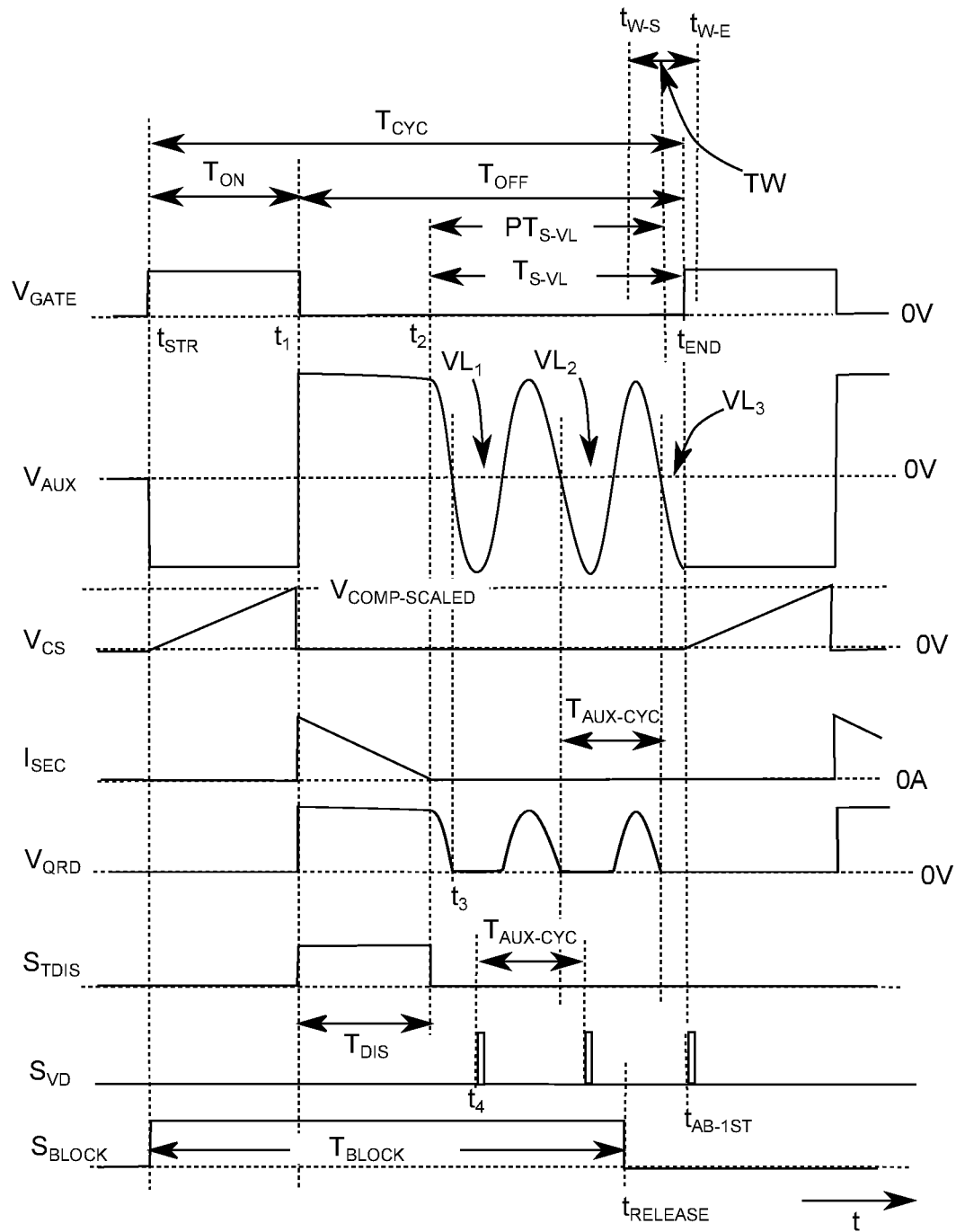
FIG. 10 demonstrates some waveforms of signals in FIG. 1 when the QR controller 26 is replaced by the QR controller 300.

FIG. 10 demonstrates some waveforms of signals in FIG. 1 when the QR controller 26 is replaced by the QR controller 300. Some waveforms in FIG. 10 have been shown in FIG. 4 and they are not explained redundantly.

An oscillation time $T_{S-VL}$ is defined to refer to the duration beginning at a certain moment after the discharge time $T_{DIS}$ ends and ending at the same moment when an OFF time $T_{OFF}$ ends. The oscillation time $T_{S-VL}$ shown in FIG. 10 starts at time point $t_2$ (when the discharge time $T_{DIS}$ just ends) and ends at the time point $t_{END}$ (when an OFF time $T_{OFF}$ and a cycle time $T_{CYC}$ conclude). In another embodiment, an oscillation time $T_{S-VL}$ could be from time point $t_3$ (when the voltage drop $V_{AUX}$ falls across 0V) or $t_4$ (when the first pulse in the valley indication signal $S_{VD}$ appears) to the time point $t_{END}$. The starting moment of the oscillation time $T_{S-VL}$ is preferably selected to be no later than time point $t_4$ in FIG. 10, which is the moment when the first pulse in the valley indication signal $S_{VD}$, after the end of the discharge time $T_{DIS}$, appears. The oscillation time $T_{S-VL}$ seems like, in a way, the total duration that the voltage drop $V_{AUX}$ has been oscillating before the cycle time $T_{CYC}$ or the OFF time $T_{OFF}$ goes to end.

A prior oscillation time $PT_{S-VL}$ is in association with the oscillation time $T_{S-VL}$ in one of previous switching cycles that happened before. For example, the present oscillation time $T_{S-VL}$ in the very present switching cycle could be the prior oscillation time $PT_{S-VL}$ in the following switching cycle.

A time window TW is defined to be the duration between time points $t_{W-S}$ and $t_{W-E}$, both in response to the prior oscillation time $PT_{S-VL}$. The time point $t_{W-S}$ is the moment a predetermined lead period ahead when the prior oscillation time $PT_{S-VL}$ concludes, while the time point $t_{W-E}$ the moment a predetermined lag period behind when the prior oscillation time $PT_{S-VL}$ concludes. It can be understood that, if a switching cycle lasts long enough, the moment when the prior oscillation time $PT_{S-VL}$ ends is between time points $t_{W-S}$ and time $t_{W-E}$. The lead period and the lag period might be the same or different, and each is smaller than one oscillation cycle time $T_{AUX-CYC}$ of of the drop voltage $V_{AUX}$, which is about the duration between two bottoms of two consecutive signal valleys. The oscillation cycle time $T_{AUX-CYC}$ is also equal to the period between two consecutive moments when the drop voltage $V_{AUX}$ falls across 0V, as shown in FIG. 10. Preferably, the length of the time window TW is less than one oscillation cycle time $T_{AUX-CYC}$.

The time point $t_{AB-1ST}$ refers to the moment when the $1^{st}$ pulse in the valley indication signal $S_{VD}$ appears after time point $t_{RELEASE}$. In other words, the time $t_{AB-1st}$ is the moment when the $1^{st}$ signal valley occurs after the block time $T_{BLOCK}$. It is unnecessary that the time point $t_{AB-1ST}$ and the time point $t_{END}$ are simultaneous as demonstrated in FIG. 10. In other words, the next switching cycle is not required to start at the time point $t_{AB-1ST}$.

Figure 11:
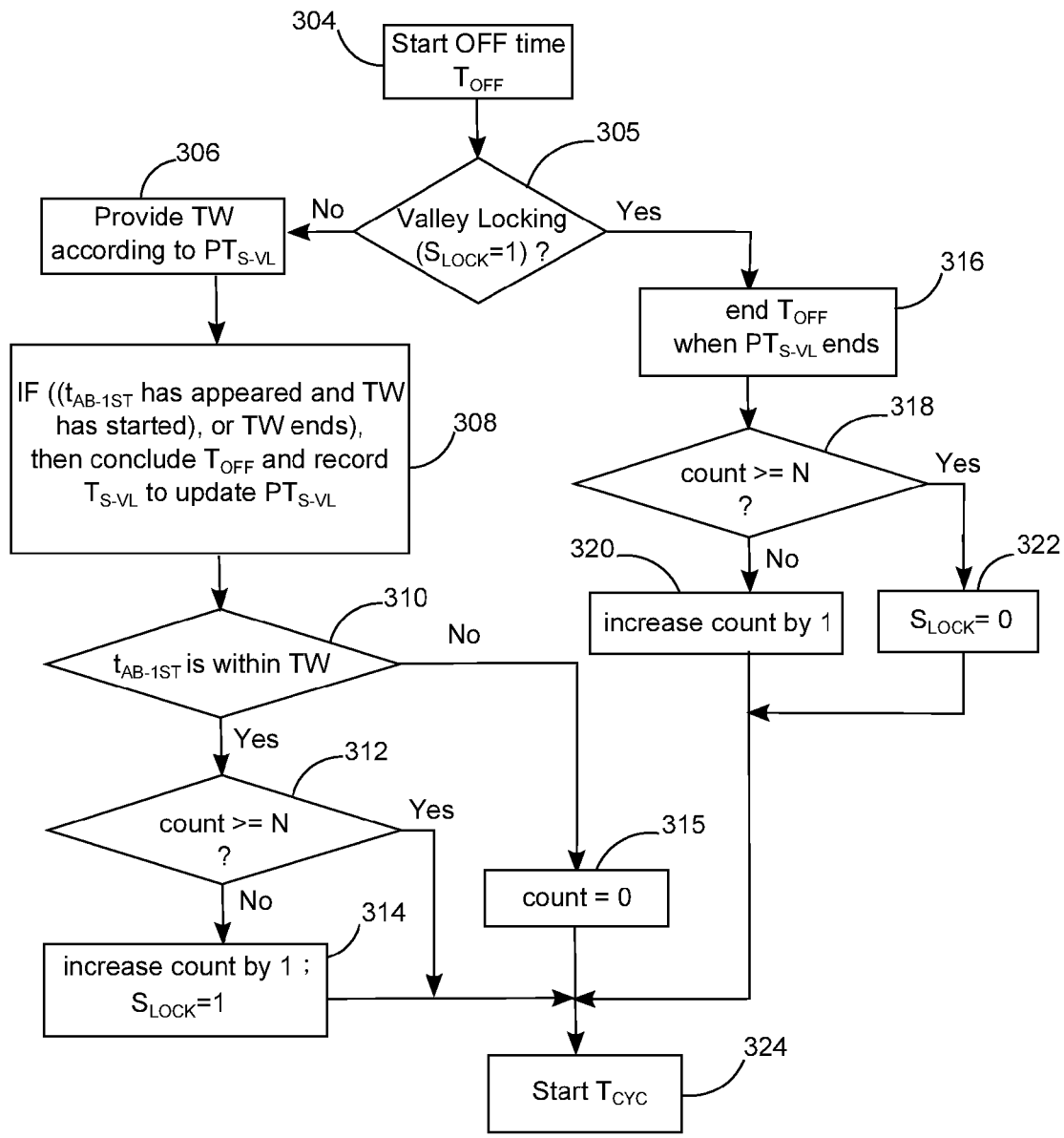
FIG. 11 shows a control method adapted by the OFF time controller.

FIG. 11 shows a control method adapted by the OFF time controller 302 in FIG. 9. The OFF time controller 302 has a register to record a lock signal $S_{LOCK}$. A lock signal $S_{LOCK}$ with "1" in logic means the activation of valley locking, forcing that the valley switching for the present switching cycle should be performed in the same signal valley as it was done for the previous switching cycle. In the opposite, a lock signal $S_{LOCK}$ with "0" in logic means the inactivation of valley locking, meaning that the present switching cycle is not required to perform valley switching in the same signal valley as before.

The OFF time controller 302 further records an oscillation time record RT, which is capable of providing the prior oscillation time $PT_{S-VL}$ used in the present switching cycle. Step 306 provides the time window TW based on the prior oscillation time $PT_{S-VL}$. In other words, step 306 determines time points $t_{W-S}$ and $t_{W-E}$, the beginning and ending of the time window TW respectively, based on the oscillation time record RT. As will be detailed later, it is not necessary that both time points $T_{W-S}$ and $t_{W-E}$ occur in a switching cycle. For example, the time point $T_{W-E}$ might not happen because the present cycle time $T_{CYC}$ concludes at the time point $T_{W-S}$.

If the lock signal $S_{LOCK}$ is "0", meaning the inactivation of valley locking, step 308 has the time point $t_{END}$ occur only within the time window TW. In step 308, the time point $t_{END}$ is forbidden to appear earlier than the time point $T_{W-S}$ or later than the time point $T_{W-E}$. As to the exact moment of the occurrence of the time point $t_{END}$, it depends on when the time point $t_{AB-1ST}$ happens. If the time point $t_{AB-1ST}$ happens ahead of the time $t_{W-S}$, then the time point $t_{END}$ is about simultaneous to the time point $T_{W-S}$. Similarly, if the time point $T_{W-E}$ happens while the time point $t_{AB-1ST}$ has not happened, then the time point $t_{END}$ is about simultaneous to the time point $T_{W-E}$. Otherwise, if the time point $t_{AB-1ST}$ appens within the time window TW, then the time point $t_{END}$ is about simultaneous to the time $t_{AB-1ST}$. According to aforementioned teaching, at time point $t_{END}$, the PWM signal $V_{GATE}$ has a rising edge to conclude both the cycle time $T_{CYC}$ and the OFF time $T_{OFF}$. The oscillation time record RT, after the conclusion of the OFF time $T_{OFF}$, is updated using the present oscillation time $T_{S-VL}$, to provide the prior oscillation time $PT_{S-VL}$ used in the next switching cycle. For the present embodiment, the moment when the OFF time $T_{OFF}$ concludes is in response to the time window TW and the time point $t_{AB-1ST}$, while the time window TW is determined by the oscillation time record RT, and the time point $t_{AB-1ST}$ is determined by the block time $T_{BLOCK}$ and the valley indication signal $S_{VD}$.

If the lock signal $S_{LOCK}$ is "1", meaning valley locking is expected, step 316 has the time point $t_{END}$ occur about at the same time when the prior oscillation time $PT_{S-VL}$ concludes. The oscillation time $T_{S-VL}$ for the present switching cycle will be the same with that for the previous switching cycle. If the previous switching cycle performs valley switching in a specific signal valley, then the present switching cycle will also perform valley switching right in the very specific signal valley. It seems like that valley switching is locked to perform constantly in the specific signal valley if the lock signal $S_{LOCK}$ is "1". That explains the terminology of valley locking.

The OFF time controller 302 in FIG. 9 further has a counter for counting how many switching cycles the valley locking has been performed, as shown in step 320 in FIG. 11. The counter also seems like a timer to calculate the duration when the valley locking has lasted. Step 322 demonstrates that the lock signal $S_{LOCK}$ is reset to "0" from "1" to disable or inactivate the valley locking if the count of the counter reaches a predetermined number N. In other words, the lock signal $S_{LOCK}$ with "1" must last for N consecutive switching cycles before being reset. After the valley locking is disabled or inactivated, if step 310 determines that the time point $t_{AB-1ST}$ does not happen within the time window TW, the present switching cycle is not performing valley switching, such that step 315 resets the counter to have the count be 0. Once the time point $t_{AB-1ST}$ reenters the time window TW as being determined by step 310, the present switching cycle starts performing valley switching, such that step 314 sets the lock signal $S_{LOCK}$ "1" in logic and increases the count by 1.

Figure 12:
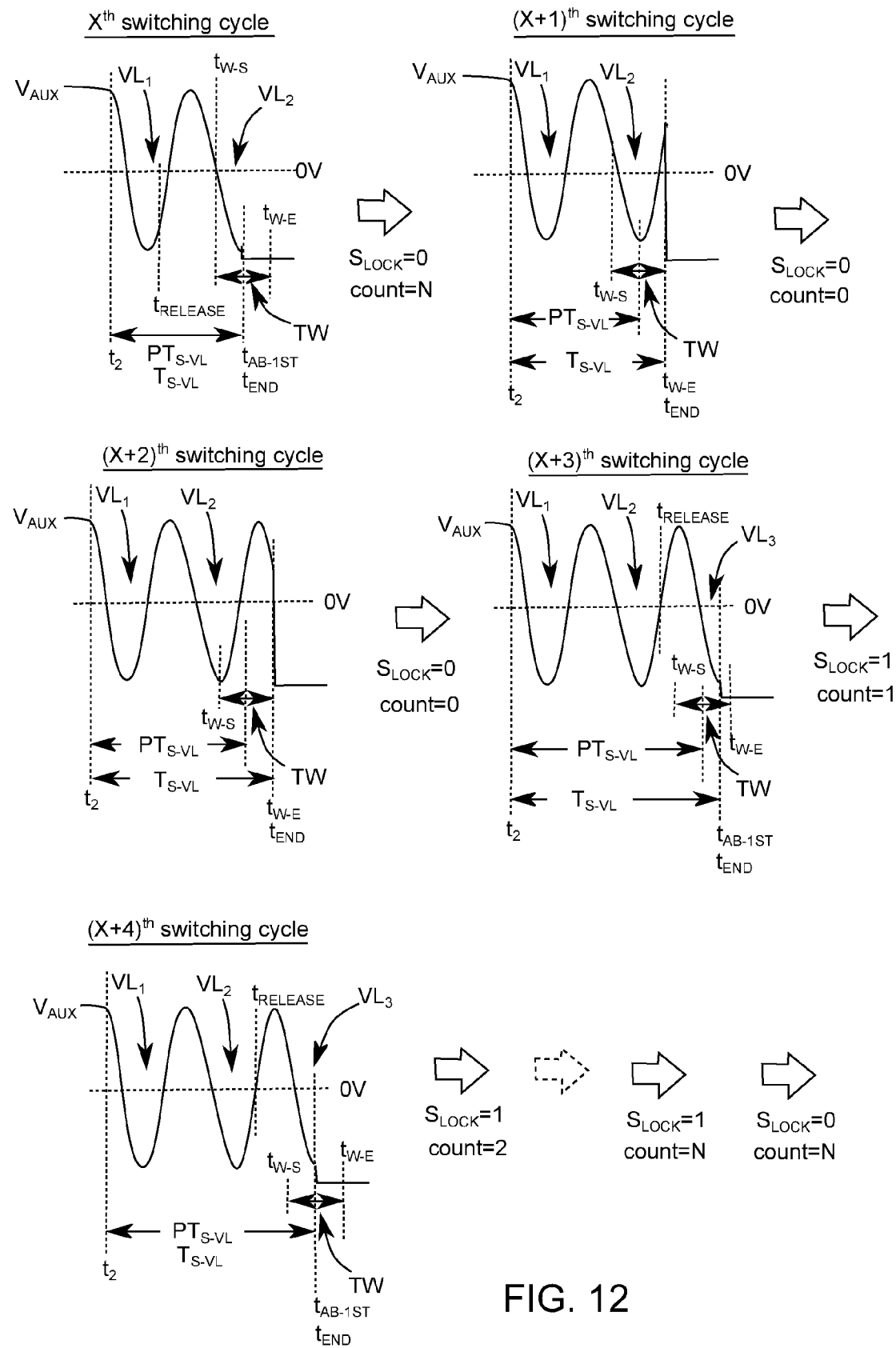
FIG. 12 shows the waveforms of the drop voltage $V_{AUX}$ and several signal timings during several consecutive switching cycles when the output load turns from heavy into light.

Please reference FIGS. 1, 9, 11 and 12 for the following, where FIG. 12 shows the waveforms of the drop voltage $V_{AUX}$ and several signal timings during several consecutive switching cycles when the output load 24 turns from heavy into light.

It is assumed that the $X^{th}$ switching cycle in FIG. 12 has reached a stable condition, where the OFF time controller 302 renders valley switching substantially at the bottom of the signal valley $VL_2$. During the $X^{th}$ switching cycle, the time point $t_{AB-1ST}$ is also the time point $t_{END}$, which is the end of a cycle time $T_{CYC}$, the oscillation time $T_{S-VL}$ is the same with the prior oscillation time $PT_{S-VL}$, the lock signal $S_{LOCK}$ is "0" in logic, and the count of the counter is N. As the time window TW has not completed before the OFF time $T_{OFF}$ ends, the time point $t_{W-E}$ actually does not occur even though it is illustratively shown there for reference. The OFF time $T_{OFF}$ for the $X^{th}$ switching cycle could be derived from FIG. 11, based on the flow consisting of the steps 304, 305, 306, 308, 310, 312 and 324.

In the beginning of the $(X+1)^{th}$ switching cycle, probably because the output load becomes lighter suddenly, the output current $I_{OUT}$ decreases, the block time $T_{BLOCK}$ becomes longer and the time point $t_{RELEASE}$ is lagged, such that the time point $t_{AB-1ST}$ has not occurred when the time window TW completes in the $(X+1)^{th}$ switching cycle. The OFF time $T_{OFF}$ for the $(X+1)^{th}$ switching cycle could be derived from FIG. 11, based on the flow consisting of the steps 304, 305, 306, 308, 310, 315 and 324. As demonstrated in FIG. 12, for the $(X+1)^{TH}$ switching cycle, the time point $t_{END}$ is about the same with the time point $t_{W-E}$, the lock signal is "0" in logic, and the count is 0. The oscillation time $T_{S-VL}$ is the lag period more than the prior oscillation time $PT_{S-VL}$ as demonstrated in FIG. 12, and this lag period is only a portion of one oscillation cycle time $T_{AUX-CYC}$ of the drop voltage $V_{AUX}$. In FIG. 12, this lag period is less than half oscillation cycle time $T_{AUX-CYC}$ of the drop voltage $V_{AUX}$. Accordingly, it is obvious in FIG. 12 that the $(X+1)^{th}$ switching cycle does not perform valley switching.

During the $(X+2)^{th}$ switching cycle in FIG. 12, the time point $t_{AB-1ST}$ is still absent when the time window TW is over. Similar with what happened in the $(X+1)^{th}$ switching cycle, the OFF time $T_{OFF}$ for the $(X+2)^{th}$ switching cycle could be derived from FIG. 11, based on the flow consisting of the steps 304, 305, 306, 308, 310, 315 and 324. The time point $t_{END}$ is about the same with the time point $t_{W-E}$, the lock signal is "0" in logic, and the count is 0. The $(X+2)^{th}$ switching cycle does not perform valley switching, either.

During the $(X+3)^{th}$ switching cycle in FIG. 12, the time point $t_{AB-1ST}$ appears inside the time window TW. Accordingly, the OFF time $T_{OFF}$ for the $(X+3)^{th}$ switching cycle could be derived from FIG. 11, based on the flow consisting of the steps 304, 305, 306, 308, 310, 312 and 314. As shown in FIG. 12, the time point $t_{END}$ is about the same with the time point $t_{AB-1ST}$, the lock signal becomes "1" in logic, and the count now is 1. Unlike the $(X+2)^{TH}$ switching cycle, the $(X+3)^{TH}$ switching cycle performs valley switching, and the valley locking is activated from now on.

Because the valley locking has been activated at the beginning of the $(X+4)^{th}$ switching cycle, the time $t_{END}$ of the $(X+4)^{th}$ switching cycle is forced to be about the end of the prior oscillation time $PT_{S-VL}$. The OFF time $T_{OFF}$ for the $(X+4)^{th}$ switching cycle could be derived from FIG. 11, based on the flow consisting of the steps 304, 305, 316, 318, and 320. The prior oscillation time $PT_{S-VL}$ is not updated even though the oscillation time $T_{S-VL}$ is the same with the prior oscillation time $PT_{S-VL}$. The lock signal is still "1" in logic, and the count now becomes 2. The $(X+4)^{th}$ switching cycle performs valley switching, too.

As shown from the process going from the $X^{th}$ switching cycle to the $(X+4)^{th}$ switching cycle, the oscillation time $T_{S-VL}$ increases cycle-by-cycle. The end of the oscillation time $T_{S-VL}$ starts first at the bottom of the signal valley $VL_2$, shifts a little bit later cycle-by-cycle, and stays finally at the bottom of the signal valley $VL_3$, as demonstrated in FIG. 12. The OFF time controller 302 limits the difference between the prior oscillation time $PT_{S-VL}$ and the oscillation time $T_{S-VL}$ to be less than one oscillation cycle time $T_{AUX-CYC}$.

After the $(X+4)^{th}$ switching cycle, both the prior oscillation time $PT_{S-VL}$ and the oscillation time $T_{S-VL}$ stay unchanged and about equal to each other if the lock signal $S_{LOCK}$ is "1". The OFF time $T_{OFF}$ for the following switching cycles could be derived from FIG. 11, based on the flow consisting of the steps 304, 305, 316, 318, and 320. As shown in FIG. 12, the count increases by 1 for each switching cycle, and the lock signal $S_{LOCK}$ stays as "1".

Eventually, when the count increases to N, the lock signal $S_{LOCK}$ will turn to "0" to inactivate the valley locking.

Figure 13:
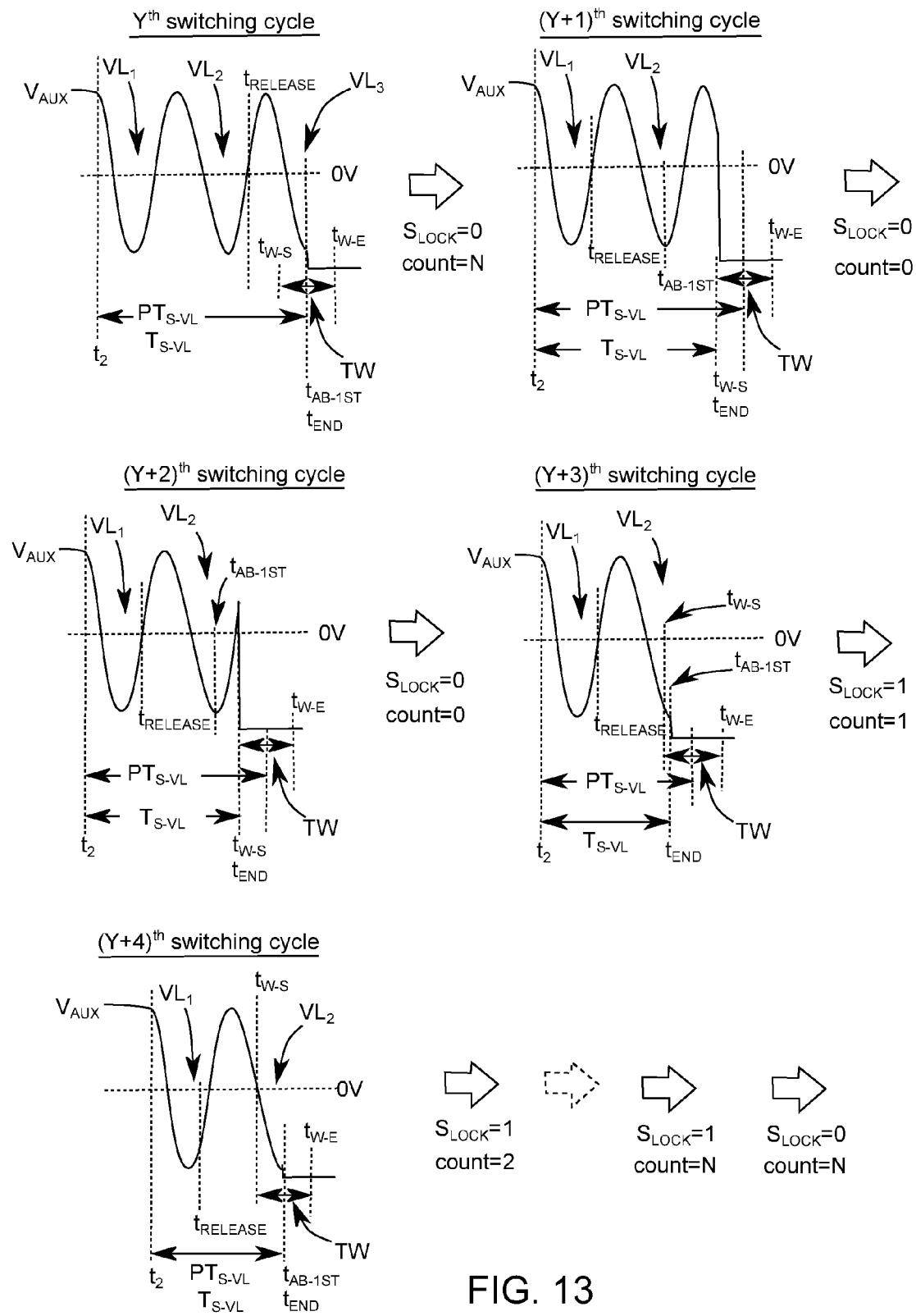
FIG. 13 shows the waveforms of the drop voltage $V_{AUX}$ and several signal timings during several consecutive switching cycles when an output load turns from light into heavy.

Please reference FIGS. 1, 9, 11 and 13 for the following, where FIG. 13 shows the waveforms of the drop voltage $V_{AUX}$ and several signal timings during several consecutive switching cycles when an output load turns from light into heavy.

It is assumed that the $Y^{th}$ switching cycle has reached a stable condition, where the OFF time controller 302 performs valley switching substantially at the bottom of the signal valley $VL_3$, similar to what happens in the final switching cycle in FIG. 12. During the $Y^{th}$ switching cycle, the time point $t_{AB\text{-}1ST}$ is about the time point $t_{END}$, which is the end of a cycle time $T_{CYC}$, the oscillation time $T_{S\text{-}VL}$ is the same with the prior oscillation time $PT_{S\text{-}VL}$, the lock signal $S_{LOCK}$ is "0" in logic, and the count of the counter is N. The OFF time $T_{OFF}$ for the $Y^{th}$ switching cycle could be derived from FIG. 11, based on the flow consisting of the steps 304, 305, 306, 308, 310, 312 and 324.

In the beginning of the $(Y+1)^{th}$ switching cycle, probably because the output load becomes heavier suddenly, the time point $t_{RELEASE}$ is leaded to occur around the end of the signal valley $VL_1$, such that the time point $t_{AB\text{-}1ST}$ occurs earlier than the moment when the time window TW starts. The OFF time $T_{OFF}$ for the $(Y+1)^{th}$ switching cycle could be derived from FIG. 11, based on the flow consisting of the steps 304, 305, 306, 308, 310, 315 and 324. As demonstrated in FIG. 13, for the $(Y+1)^{th}$ switching cycle, the time point $t_{END}$ is about the same with the time point $T_{W\text{-}S}$, the lock signal $S_{LOCK}$ is "0" in logic, and the count is 0. The oscillation time $T_{S\text{-}VL}$ is a lead period shorter than the prior oscillation time $PT_{S\text{-}VL}$ as demonstrated in FIG. 13, and this lead period is only a portion of one oscillation cycle time of the drop voltage $V_{AUX}$. In FIG. 13, this lead period is less than half oscillation cycle time of the drop voltage $V_{AUX}$. Accordingly, it is obvious in FIG. 13 that the $(Y+1)^{th}$ switching cycle does not perform valley switching.

During the $(Y+2)^{th}$ switching cycle in FIG. 13, the time point $t_{AB\text{-}1ST}$ still occurs prior to the beginning of the time window TW. Accordingly, the OFF time $T_{OFF}$ for the $(Y+2)^{th}$ switching cycle could be derived from FIG. 11, based on the flow consisting of the steps 304, 305, 306, 308, 310, 315 and 324. The time point $t_{END}$ is still about the same with the time point $T_{W\text{-}S}$, the lock signal is "0" in logic, and the count is 0. The $(Y+2)^{th}$ switching cycle does not perform valley switching, either.

During the $(Y+3)^{th}$ switching cycle in FIG. 13, the time point $t_{AB\text{-}1ST}$ appears inside the time window TW. Accordingly, the OFF time $T_{OFF}$ for the $(Y+3)^{th}$ switching cycle could be derived from FIG. 11, based on the flow consisting of the steps 304, 305, 306, 308, 310, 312 and 314. As shown in FIG. 13, the time point $t_{END}$ is about the same with the time point $t_{AB\text{-}1ST}$, the lock signal becomes "1" in logic, and the count now is 1. Unlike the $(Y+2)^{th}$ switching cycle, the $(Y+3)^{TH}$ switching cycle performs valley switching, and the valley locking is activated from now on.

Because the valley locking has been activated before the beginning of the $(Y+4)^{th}$ switching cycle, the time point $t_{END}$ is forced to be about the end of the prior oscillation time $PT_{S\text{-}VL}$. The OFF time $T_{OFF}$ for the $(Y+4)^{th}$ switching cycle could be derived from FIG. 11, based on the flow consisting of the steps 304, 305, 316, 318, and 320. The prior oscillation time $PT_{S\text{-}VL}$ is not updated even though the oscillation time $T_{S\text{-}VL}$ is the same with the prior oscillation time $PT_{S\text{-}VL}$. The lock signal $S_{LOCK}$ is still "1" in logic, and the count now becomes 2. The $(Y+4)^{th}$ switching cycle performs valley switching, too.

As shown from the process going from the $Y^{th}$ switching cycle to the $(Y+4)^{th}$ switching cycle, the oscillation time $T_{S\text{-}VL}$ decreases cycle-by-cycle. The end of the oscillation time $T_{S\text{-}VL}$ starts first at the bottom of the signal valley $VL_3$, shifts a little bit earlier cycle-by-cycle, and stays finally at the bottom of the signal valley $VL_2$, as demonstrated in FIG. 13.

After the $(Y+4)^{th}$ switching cycle, both the prior oscillation time $PT_{S\text{-}VL}$ and the oscillation time $T_{S\text{-}VL}$ stay unchanged and about equal to each other. The OFF time $T_{OFF}$ for the following switching cycles could be derived from FIG. 11, based on the flow consisting of the steps 304, 305, 316, 318, and 320. As shown in FIG. 13, the count increases by 1 for each switching cycle, and the lock signal $S_{LOCK}$ stays as "1". Eventually, when the count increases to N, the lock signal $S_{LOCK}$ will turn to "0" to disable or inactivate the valley locking.

The teaching of FIGS. 11, 12 and 13 exemplifies that the valley locking to a certain signal valley is activated the first time when valley switching in the certain signal valley is performed, and that the valley locking is disabled or inactivated after the valley switching in the certain signal valley has continued for N consecutive switching cycles. Soft transition for valley switching is also exemplified in FIGS. 11, 12, and 13, where at least one switching cycle not performing valley switching is inserted between two switching cycles performing valley switching in two neighboring signal valleys, respectively.

Figure 14:
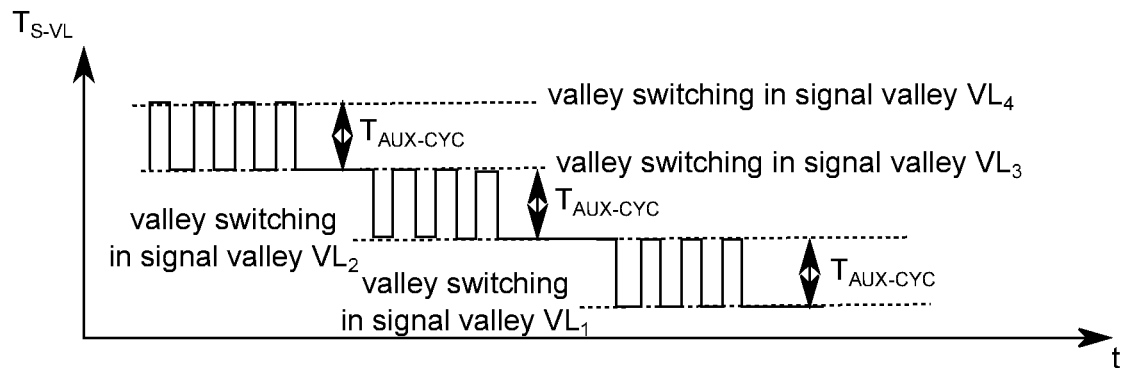
FIG. 14 shows possible variation to the oscillation time $T_{S-VL}$ of the prior art.

FIG. 14 shows possible variation to the oscillation time $T_{S\text{-}VL}$ of the prior art, which performs neither soft transition for valley switching, nor valley locking. Demonstrated in FIG. 14, because of the lack of soft transition for valley switching, the difference between two oscillation times $T_{S\text{-}VL}$ of two different switching cycles must be an integral number of the oscillation cycle time $T_{AUX\text{-}CYC}$. As aforementioned, the oscillation cycle time $T_{AUX\text{-}CYC}$ is about equal to the time difference between two neighboring bottoms of signal valleys. As the oscillation times $T_{S\text{-}VL}$ might change largely to an extent of several oscillation cycle times $T_{AUX\text{-}CYC}$, the power converter in the prior art might be unstable and has large output ripple in the output voltage $V_{OUT}$.

Furthermore, the prior art in FIG. 14 lacks the technique of valley locking, such that the valley switching might jump back and forth quickly in two neighboring signal valleys, as shown in FIG. 14.

Figure 15:
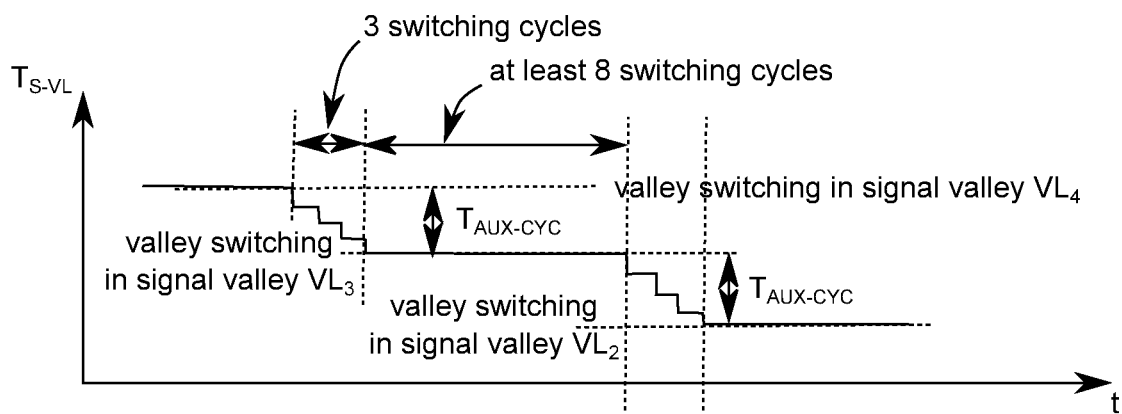
FIG. 15 shows possible variation to the oscillation time $T_{S-VL}$ according to one embodiment of the invention.

FIG. 15 shows possible variation to the oscillation time $T_{S\text{-}VL}$ according to one embodiment of the invention. FIG. 15 demonstrates the result of the soft transition for valley switching, as the valley switching in signal valley $VL_4$ transits to the valley switching in signal valley $VL_3$ softly via three consecutive switching cycles performing no valley switching. FIG. 15 also demonstrates the result of the valley locking, where the valley switching in signal valley $VL_3$ is performed at least 8 times (for 8 consecutive switching cycles) before transiting to the valley switching of a neighboring signal valley. By comparing with the oscillation times $T_{S\text{-}VL}$ in FIG. 14, the oscillation times $T_{S\text{-}VL}$ in FIG. 15 varies smoother, making a power converter much more stable.

The QR controller 300 of FIG. 9 introduces 3 different techniques. One is the block time $T_{BLOCK}$ in response to the load representative signal $V_{L\text{-}EST}$; another is the soft transition for valley switching; and the other is the valley locking. This invention is not limited to what is introduced in FIG. 9, nevertheless. One embodiment of the invention might perform only one of the three techniques, any two of the three techniques, or all of the three techniques. For example, one embodiment of the invention has the functions of both the block time $T_{BLOCK}$ in response to the load representative signal $V_{L-EST}$ and the soft transition for valley switching, but lacks the function of the valley locking. Another embodiment might be able to perform the soft transition for valley switching and the valley locking, but its block time $T_{BLOCK}$ is in response to the compensation signal $V_{COMP}$ rather than the load representative signal $V_{L-EST}$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power controller suitable for a switching mode power supply, wherein the switching mode power supply has a power switch connected in series with an inductive device, and provides an output voltage to an output load, the power controller comprising:
    an output current estimator, for providing a load representative signal in response to a discharge time of the inductive device and a current sense signal, wherein the current sense signal represents a current through the inductive device;
    a block time generator, for providing a block time based on the load representative signal;
    a pulse width modulator for generating a pulse-width-modulation signal to control the power switch in response to a compensation signal, wherein the compensation signal is in response to the output voltage; and
    a logic for making a cycle time of the pulse-width-modulation signal not less than the block time.

2. The power controller as claimed in claim 1, wherein the pulse-width-modulation signal has a pulse width determined by the compensation signal, and the pulse width determines an ON time of the power switch.

3. The power controller as claimed in claim 1, wherein the cycle time is the same with the block time.

4. The power controller as claimed in claim 1, further comprising:
    a valley detector, coupled to the inductive device, for detecting a voltage drop across the inductive device, wherein the voltage drop oscillates after the discharge time to generate at least one signal valley, and the valley detector provides a valley indication signal to indicate the occurrence of the signal valley;
    wherein the logic, in response to the valley indication signal, makes the cycle time end at the time point when the first signal valley occurs after the block time ends.

5. The power controller as claimed in claim 1, further comprising:
    a jittering apparatus coupled to the block time generator, for providing a control signal with a jittering frequency to jitter the block time;
    wherein the jittering frequency is less than the reciprocal of the cycle time.

6. The power controller as claimed in claim 1, further comprising:
    a discharge time detector, coupled to the inductive device, for detecting a voltage drop across the inductive device to provide a discharge time signal capable of indicating the discharge time.

7. The power controller as claimed in claim 1, wherein the load representative signal is generated in response to an accumulative result of the current sense signal over the discharge time.

8. The power controller as claimed in claim 1, wherein the output current estimator integrates the current sense signal over the discharge time to be a first integral, integrates a charge current over the cycle time to be a second integral, and provides a feedback mechanism controlling the charge current to equalize the first and second integrals.

9. A control method suitable for a switching mode power supply, wherein the switching mode power supply has a power switch connected in series with an inductive device, and provides an output voltage to an output load, the control method comprising:
    providing a PWM signal to control the power switch, wherein the PWM signal has a pulse width and a cycle time;
    detecting a voltage drop across the inductive device to indicate a discharge time of the inductive device;
    generating a load representative signal in response to the discharge time and a current sense signal, wherein the current sense signal represents a current passing through the inductive device;
    providing a block time signal capable of indicating a block time;
    determining the pulse width in response to a compensation signal controlled by the output voltage; and
    making the cycle time not less than the block time.

10. Then control method as claimed in claim 9, further comprising:
    providing a jittering signal to jitter the block time;
    wherein a jittering frequency of the jittering signal is less than the reciprocal of the cycle time.

11. Then control method as claimed in claim 9, further comprising:
    ending the cycle time right after the block time ends.

12. Then control method as claimed in claim 9, wherein the voltage drop oscillates after the discharge time to generate at least one signal valley, the control method further comprising:
    ending the cycle time at the moment when the first signal valley after the block time occurs.

13. Then control method as claimed in claim 9, wherein the load representative signal is capable of representing an output current provided to the output load.

* * * * *